United States Patent Office 3,488,465
Patented Jan. 6, 1970

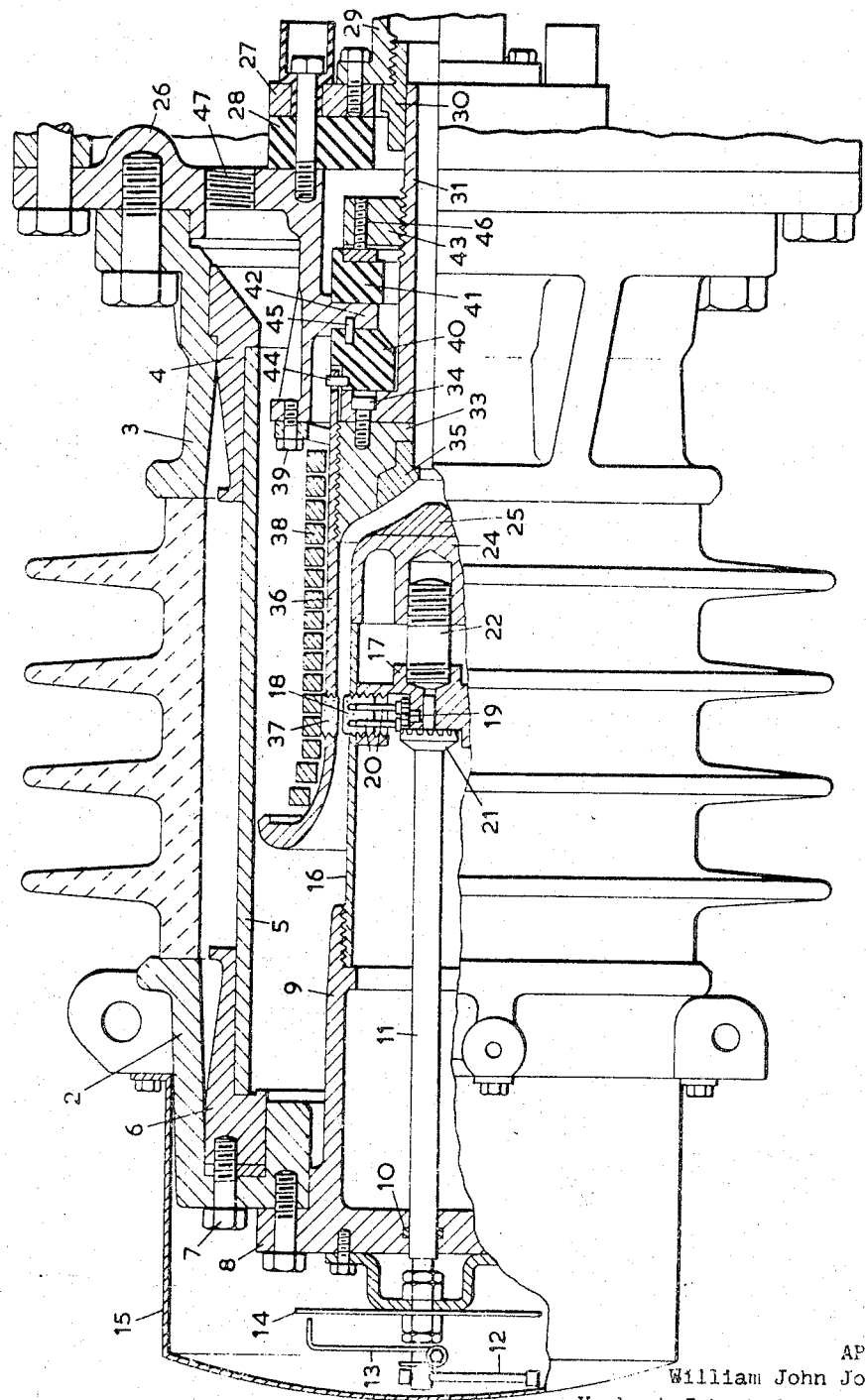

3,488,465
CAPACITOR PROTECTING SWITCHING DEVICES WITH RAISED CONTACTS ON COAXIAL ELECTRODES, AND AIR BLAST EXTINCTION MEANS
William John Joyce and Herbert Joseph Shapcott Wells, Stafford, England, assignors to The English Electric Company Limited, London, England, a British company, and British Insulated Callender's Cables Limited, London, England, a British company
Filed Sept. 27, 1966, Ser. No. 582,279
Claims priority, application Great Britain, Sept. 27, 1965, 40,948/65
Int. Cl. H01h 33/82
U.S. Cl. 200—148      5 Claims

ABSTRACT OF THE DISCLOSURE

A capacitor-protecting switching device including a pressurised casing having two coaxial electrodes each with a number of contacts outstanding therefrom defining between them a spark gap adapted to breakdown upon an A.C. voltage across it exceeding a predetermined value. An exhaust valve is provided which is operable in response to such breakdown to exhaust the casing whereby the gas is continuously blasted between the electrodes to extinguish the arc, a coil being wound about the electrodes to rotate the arc away from the contacts.

---

This invention relates to protective switching devices, and particularly, but not exclusively, relates to switching devices for protecting capacitors connected in series with high voltage transmission lines.

Such capacitors are connected in series with the high voltage line to compensate for the inductance possessed by the line thereby to improve the power factor, reduce the losses and, in the case of two parallel lines, ensure correct current sharing. They may also be used to improve system stability when long lines are involved. These capacitors are conveniently mounted on insulators in banks, one bank per phase.

However, since these capacitors are connected in series with the line they are liable to be damaged by any fault current which may flow, the voltage developed across these capacitors being directly proportional to the current. Accordingly, these capacitors must be protected and this is effected by switching devices which can effectively switch them out of circuit upon the occurrence of a fault current in excess of a predetermined magnitude.

In general, it is economical to use capacitors which will safely withstand voltages up to three times their normal rating for a short while and to provide switching devices which will by-pass the capacitors if the fault persists or if the voltage rises to a higher value.

When a fault condition is manifested the fault current will continue to flow until a circuit breaker interrupts the line and isolates the fault. Now if the fault should be on the load side of the line concerned, i.e. in one of the feeders, the circuit breaker associated with that feeder will open and the line would again be carrying the normal load current, and in this event it is normally desirable for the capacitors to be rapidly reconnected in circuit, e.g. within about 2 cycles in a system operating at 50 or 60 cycles per second.

Thus in a typical 400 kv. line the sort of values which might apply are as follows. The line may be rated at 1000 amps R.M.S., the normal voltage across each capacitor may be 40 kv. and a fault current of 7500 amps R.M.S., may be expected. The switching device should therefore be set to breakdown at 120 kv. and be capable of carrying 7500 amps for at least 5 cycles, by which time the circuit breaker should have operated, and to recover within about 2 cycles when the fault has been isolated.

From one aspect, the present invention consists in a switching device comprising a casing adapted to be connected to a high pressure gas source and having therein first and second electrodes defining therebetween a spark gap adapted to breakdown upon an alternating voltage developed thereacross exceeding a predetermined magnitude, and an exhaust valve operable in response to said breakdown to exhaust said casing whereby the gas is continuously blasted through said electrodes to extinguish said arc upon the instantaneous magnitude of the current therein reducing towards zero.

Preferably, each electrode includes a body portion and arcing contacts which oustand from the body portions, the contacts defining a gap between them which is smaller than that between the body portions of the electrodes. The arcing contacts may conveniently be made from graphite whilst the body portions of the electrode are metallic.

Means may also be provided for rotating the arc between the electrodes so as to prevent the arc from lingering on the graphite contacts.

The spacing between the graphite contacts may conveniently be adjusted from outside the casing so as to control the breakdown value.

In order that this invention may be fully understood, one embodiment thereof will now be described with reference to the accompanying drawing, which shows a half-sectioned side elevation of a switching device according to the invention.

Referring now to the drawing, the device comprises a casing having a cylindrical porcelain body with two terminal plates 2 and 3 at its ends. A sleeve 4 is mounted within the terminal plate 3 and has secured to it a glass-fibre tube 5. The other end of the tube 5 is secured to a similar sleeve 6, this sleeve being secured by bolts 7 (only one of which is shown) to the terminal plate 2 so that the glass-fibre tube 5 is in tension and the porcelain body is held in compression.

A cylindrical end member 8 is bolted to the terminal plate 2 and lies coaxially therein, this member having an elongated inwardly extending boss 9 of annular cross-section and a central aperture with an O ring type seal 10 through which extends a rotatable rod 11. The rod 11 carries a tommy bar 12 at one end together with a pointer 13 which lies adjacent a fixed scale 14. A dome-shaped cap 15 encloses this pointer and scale.

A thin-walled non-magnetic, stainless steel tube 16 is secured to the inner end of the boss 9 and carries a plate 17 having three radially extending screw-threaded bores therein (only one of which is shown) each of which accommodates a screw-threaded graphite button 18. In turn, each button 18 is secured to a gear wheel 19 by two pins 20, the gear being mounted for rotation in the plate 17 and engaging a crown gear or contrate wheel 21 carried on the end of the rod 11. Thus rotation of the rod 11 effects radial movement of the buttons 18.

The plate 17 is in addition axially threaded to receive a threaded stud 22 to which is secured a removable dome-shaped end block 24 which abuts the tube 16 and carries an arc metal tip 25 on its inner face.

The terminal plate 3 has bolted to it an end plate 26. In turn, a ring 27 is bolted to this end plate, through the intermediary of an insulating spacer ring 28, and an exhaust valve assembly 29 is bolted to the ring 27. A collar 30 is screw-threaded into the valve 29 and makes sliding fit with a sleeve 31. The inner end of this sleeve has an end block 33 secured to it by screws 34 (only one of which is shown), this end block carrying an arc metal tip 35 and being spaced from, and conforming in shape to, the end block 24, so as to define a channel therebetween having a good air flow form. Screw-threaded into the end block 33 is a thin-walled, non-magnetic, stainless steel tube 36 which is outwardly flared at its inner end and carries three fixed graphite buttons 37 which lie opposite the three buttons 18, respectively.

The tube 36 has three equidistantly spaced axially extending saw cuts made in it to reduce the affects of eddy currents set up upon current flowing through a helically wound copper coil 38 which is wound about this tube. One end of this coil is secured to the flanged portion of the tube 36 and the other end is secured by screws 39 to the end plate 26.

Support for the assembly of components 31, 33 and 35 to 38, is effected through two insulating rings 40, 41 which are located on opposite sides of an annular projection 42 of the plate 26, the ring 40 being held between th projection 42 and a flanged portion of the sleeve 31 and the ring 41 being held between this projection and a clamping ring 43.

A metal peg 44 upstands from the ring 40 and registers with a slot in the tube 36, and a dowel pin 45 extends through the projection 42 and mates with a recess in the ring 40 to ensure correct alignment of the graphite buttons and the coil connection.

In addition, a number of grub screws 46, only one of which is shown, extend through the clamping ring 43, these screws being screwed against a washer interposed between this clamping ring and the projection 42 to effect final tightening of the above-mentioned assembly.

The interior chamber defined by the switching device is connected to a source of compressed air through a bore 47 in the end plate 26 and the passage defined by the sleeve 31 is selectively closed-off or exhausted through the exhaust valve 29, operated by a relay in a manner described below, this relay being connected between the switching device and the transmission line.

In operation, the terminal plates 2 and 3 are connected directly across the capacitor being protected, and should a fault cause the voltage across this capacitor to rise to a predetermined value, e.g. 120 kv. as mentioned above, then one or more of the spark gaps will break down and an arc will be drawn between the appropriate graphite buttons. A current path is therefore made between the inner "electrode" and the outer "electrode" this current passing through the coil 38 and thereby developing a force which rotates the arc towards the end blocks 24 and 33. This current flow energises the relay referred to above and opens the exhaust valve whereby compressed air in the chamber is allowed to exhaust to atmosphere through the interelectrode space. As a result, at zero current in the alternating cycle, the "gas blast" can extinguish the arc, this extinction however being only momentary if the fault persists since the voltage rapidly builds up and the spark gap breaks down again. As soon as the fault current ceases however, the arc will be extinguished immediately or at most within two cycles depending on the proximity of the arc to the end blocks, whereupon the protected capacitor will again carry the normal load current and the exhaust valve will close.

The dimensions of the compressed air inlet bore and the exhaust port are such that the pressure within the chamber does not fall appreciably during the period for which the exhaust valve is open, that is, before the fault is isolated. In addition, the response time of the relay and the inertia of the exhaust valve is not closed upon the repetitive arc interruption during a persistent fault.

A device according to this invention affords a number of advantages over the known types of switching devices. In particular, the chamber within the device is continually under high pressure, thus permitting a comparatively small spark gap and a rapid arc extinction, and ensuring that the breakdown voltage between the graphite buttons does not vary by reason of pressure changes.

The use of graphite buttons mounted in metallic electrodes is also advantageous. In particular, graphite is a poor conductor but it does not form raised globules of molten metal as a result of arcing and therefore it is beneficial to draw an arc between these buttons. Should these buttons be allowed to become too hot as a result of arcing however, the breakdown voltage would reduce and therefore it is desirable for the arc to be moved from these graphite buttons on to the metal electrodes as soon as possible. This is readily achieved by mounting these buttons in the metal electrodes, and the probability of small globules of molten metal being formed on these electrodes is reduced by the movement of the arc under the action of the magnetic field, although the occurrence of such globules would not be so important in this region by reason of the comparatively large spacing between the electrodes.

In order to take account of certain other contingencies attendant upon protective systems for series capacitors, a by-pass switch may be connected in parallel with the switching device according to this invention. This by-pass switch, and the control circuit therefore, may conveniently be in the form of that described in our copending patent application No. 582,293 filed on the same date as this application and bearing the title "Improvements in and Relating to Control Circuits for Protective Switching Devices."

We claim:
1. A protective switching device comprising:
   a pressurised casing connected to a high pressure gas source,
   a first fixed electrode mounted within said casing,
   a second fixed electrode mounted within said casing coaxial with, and embraced by, said first electrode whereby to define an annular channel therebetween, the electrodes including
   a cylindrical body having a first portion, and a second portion inwardly tapered towards one end so that the channel defined thereby progressively reduces in diameter, and
   co-operating arcing contacts which radially outstand from said first portion into said channel, whereby the arcing contacts associated with the first and second electrodes define between them a spark gap adapted to break down and conduct current upon an alternating voltage developed thereacross exceeding a predetermined magnitude,
   a member coupled to the arcing contacts associated with the second electrode and traversing said casing, said member being adjustable exteriorly of the casing to adjust the gap defined between the arcing contacts,
   a helical coil wound about said first electrode and connected in series with said spark gap whereby to rotate the arc away from the arcing contacts in response to said breakdown,
   exhaust valve means mounted within the casing and defining a passage adjacent said body portions of both the first and second electrodes and communicating with the said annular channel, and
   control means responsive to the current conducted across the gap for opening the valve means and exhausting the casing whereby the gas is continuously blasted through the channel between the electrodes to extinguish the arc upon the instantaneous magnitude of said current reducing towards zero.

2. A protective switching device comprising:
   a pressurised casing connected to a high pressure gas source,
   a first electrode mounted within said casing,
   a second electrode mounted within said casing coaxial with, and embraced by, said first electrode whereby to define an annular channel therebetween, each electrode including
   a metallic cylindrical body portion, and
   arcing contacts which outstand from said portion into said channel whereby the arcing contacts associated with the first and second electrodes define between them a spark gap smaller than that between the body portions of the electrodes and adapted to break down and conduct current upon an alternating voltage developed thereacross exceeding a predetermined magnitude, and wherein the body portion of the second electrode includes means defining threaded bores extending perpendicularly to the axis thereof, the arcing contacts associated with the second electrode being screw-threaded and carried in said threaded bores, a member associated with said second electrode and traversing the casing, and gear wheels coupling together the arcing contacts and the said member so that rotational movement of the member effected exteriorly of the casing selectively drives the arcing contacts associated with the second electrode towards and away from their corresponding contacts associated with the first electrode, exhaust valve means mounted within the casing and defining a passage adjacent said body portions of both the first and second electrodes and communicating with the said annular channel, and control means responsive to the current conducted across the gap for opening the valve means and exhausting the casing whereby the gas is continuously blasted through the channel between the electrodes to extinguish the arc upon the instantaneous magnitude of said current reducing towards zero.

3. A switching device according to claim 2, comprising:

a helical coil wound about said first electrode and connected in series with the spark gap whereby to rotate the arc away from the arcing contacts in response to breakdown of said gap.

4. A switching device according to claim 3, wherein said body portion of the first electrode comprises:

a part made from a non-magnetic metal and which defines a plurality of axially extending slots to reduce the affects of eddy-currents generated upon energisation of said coil.

5. A switching device according to claim 3, wherein the arcing contacts are made from graphite.

References Cited

UNITED STATES PATENTS

| | | | |
|---|---|---|---|
| 3,350,529 | 10/1967 | Forwald | 200—148 |
| 1,914,875 | 6/1933 | Whitney et al. | 200—148 |
| 2,290,086 | 7/1942 | Beldi | 313—217 X |
| 2,414,308 | 1/1947 | Kalb | 317—65 X |
| 2,598,914 | 6/1952 | Huber et al. | 313—217 X |
| 2,760,121 | 8/1956 | Roth. | |
| 2,896,104 | 7/1959 | Sedlacek | 313—217 X |
| 3,223,893 | 12/1965 | Greber | 317—65 |
| 3,229,145 | 1/1966 | Jensen | 313—217 X |
| 3,253,177 | 5/1966 | Hamilton | 317—61 X |
| 3,376,458 | 4/1968 | Liao | 317—61.5 X |

ROBERT K. SCHAEFER, Primary Examiner

ROBERT A. VANDERHYE, Assistant Examiner

U.S. Cl. X.R.

313—219; 317—12, 65